United States Patent [19]

Nakamura

[11] Patent Number: 4,591,239

[45] Date of Patent: May 27, 1986

[54] OPTICAL LENS HOLDER

[75] Inventor: Kiyoji Nakamura, Ayase, Japan

[73] Assignee: Fuji Photo Film Co., Ltd., Kanagawa, Japan

[21] Appl. No.: 594,712

[22] Filed: Mar. 29, 1984

[30] Foreign Application Priority Data

Mar. 31, 1983 [JP] Japan .............................. 58-45811[U]
Mar. 31, 1983 [JP] Japan .............................. 58-45812[U]

[51] Int. Cl.⁴ .......................... G02B 7/02; G02B 7/04
[52] U.S. Cl. .................................... 350/254; 350/255; 350/257
[58] Field of Search ............................... 350/254–255, 350/257; 353/101

[56] References Cited

U.S. PATENT DOCUMENTS

| 1,032,065 | 7/1912 | Kamm | 350/257 |
| 3,563,637 | 2/1971 | Ferguson | 350/255 |
| 4,067,648 | 1/1978 | Spreitzer | 350/254 |
| 4,327,974 | 5/1982 | Schmidt | 350/257 |

Primary Examiner—William H. Punter

[57] ABSTRACT

A device for holding optical lenses wherein an inserting member is inserted in a guide member secured on an optical apparatus, a bolt having a tapered seat is inserted into a cone-shaped hole bored on the inserting member to generate a force, the tip end of the inserting member abuts on a stopper of the guide member with a component of the generated force for positioning, and the inserting member is equipped with a lens mounting mechanism which can hold a plural number of lenses and can select an arbitrary lens for use.

5 Claims, 8 Drawing Figures

OPTICAL LENS HOLDER

BACKGROUND OF THE INVENTION

This invention relates to a device for holding optical lenses and aims to offer a holder which allows easy exchange of lenses even in the narrow space between the holding device and an optical apparatus per se and which can position lenses with a higher precision for proper alignment in the optical instrument.

An example of an optical apparatus is described referring to a microfilm reader-printer shown in FIG. 1. The light from a lamp chamber 3 illuminates a microfilm 2 interposed between film carriers 1 or a pair of glass plates. The image of the microfilm 2 is enlarged by a lens 4, reflected by mirrors 5, 6 and 7 and focused on a screen 8. Plural conveyor belts 9 carry an electrophotosensitive paper (not shown) in the direction from the backside of the drawing to the front. Along the direction of the conveyor belt 9, a charging device, an exposure area, a development device and a fixing device are arranged consecutively in that order (not shown) to construct an electrophotographic copier. When the mirror 6 is pivotally moved to the position indicated by the two-dot chain line in the figure, the image of the microfilm 2 is enlarged by the lens 4, reflected by the mirror 5 and a mirror 10 and caused to focus on said exposure area. Then, the electrophotographic copier prints a copy of the image. In such a microfilm reader-printer, images can be observed on the screen 8 and also reproduced in hard-copy by the electrophotographic copier. In the figure, the reference numeral 11 denotes a main body cage, and 12 the space for mounting a holder.

Conventional microfilm reader-printers or other optical apparatuses have such defects as follows:

(1) In inexpensive devices, the lens 4 was either fixed directly on the main body cage 11 or attached thereto with a simple device such as a screw-type device. If it is fixed, the lens can not be exchanged nor is it possible to change magnification. Even if it is detachable, a simple attachment is used to save cost, and the workability of the attach/detach operation is not quite satisfactory. Furthermore, as the space 12 is extremely limited, difficulty in replacement or exchange work increases.

(2) In expensive devices, on the other hand, there is generally provided a sophisticated lens exchanging device which can be attached with a plurality of lenses. If plural lenses of different magnifications are once mounted on such an exchanging device, a lens of any magnification may arbitrarily be selected and used. However, the work of attaching or detaching lenses on such a lens exchanging device must still be performed within the extremely limited space 12, thus posing a problem. Furthermore, the maximum number of the lenses mountable on such a lens exchanging device is predetermined quite rigidly. If an optical apparatus already has a lens exchanging device which can mount up to two lenses and a user still wants to increase the number of lenses, the user may remove this device and exchange it for another device which can mount a larger number of, for instance three, lenses. But this is neither practical nor economical to the user.

SUMMARY OF THE INVENTION

This invention was conceived in view of the above mentioned point. The present invention has an object of providing an optical lens holding device which allows easier lens exchange, aligns thus exchanged lenses with higher precision, and can be modified to accommodate a larger number of lenses. In order to achieve such an object, the optical lens holder comprises (1) a guide member secured on an optical apparatus and having a sliding member and a stopper provided on the tip end thereof; (2) an inserting member which slides along the sliding member to be inserted into said guide member, abuts on the stopper on the tip end thereof, and has an inclined surface; (3) a receptacle member provided on said guide member; (4) an engaging member having a contacting surface corresponding to the inclined surface and which is adapted to push the tip end of said inserting member onto the stopper with a component of the force generated by sliding the contacting surface on the inclined surface when this member is being engaged with the receptacle member; (5) a focus ring having a threaded inner circumference and mounted rotatably on said inserting member; (6) a lower member in a ring form having threaded outer circumference which is mated with the threaded portion of said focus ring and limited in rotation; and (7) an upper member which is mounted rotatably on the lower member and holds at least one or more lenses in an attachable/detachable manner.

DESCRIPTION OF THE PREFERRED EMBODIMENTS

Figure 1:
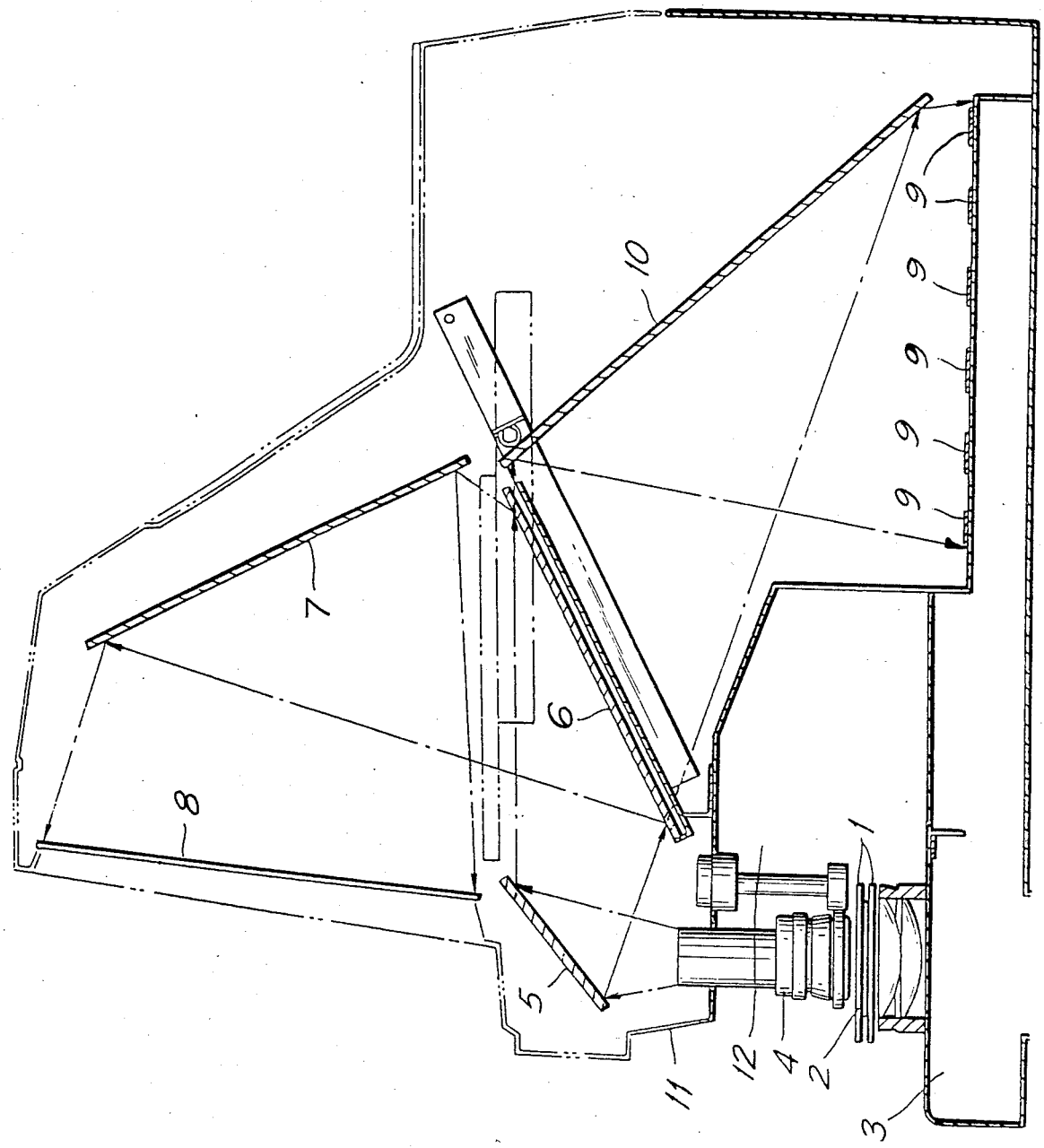
FIG. 1 is a cross sectional view of a microfilm reader-printer.
Figure 2:
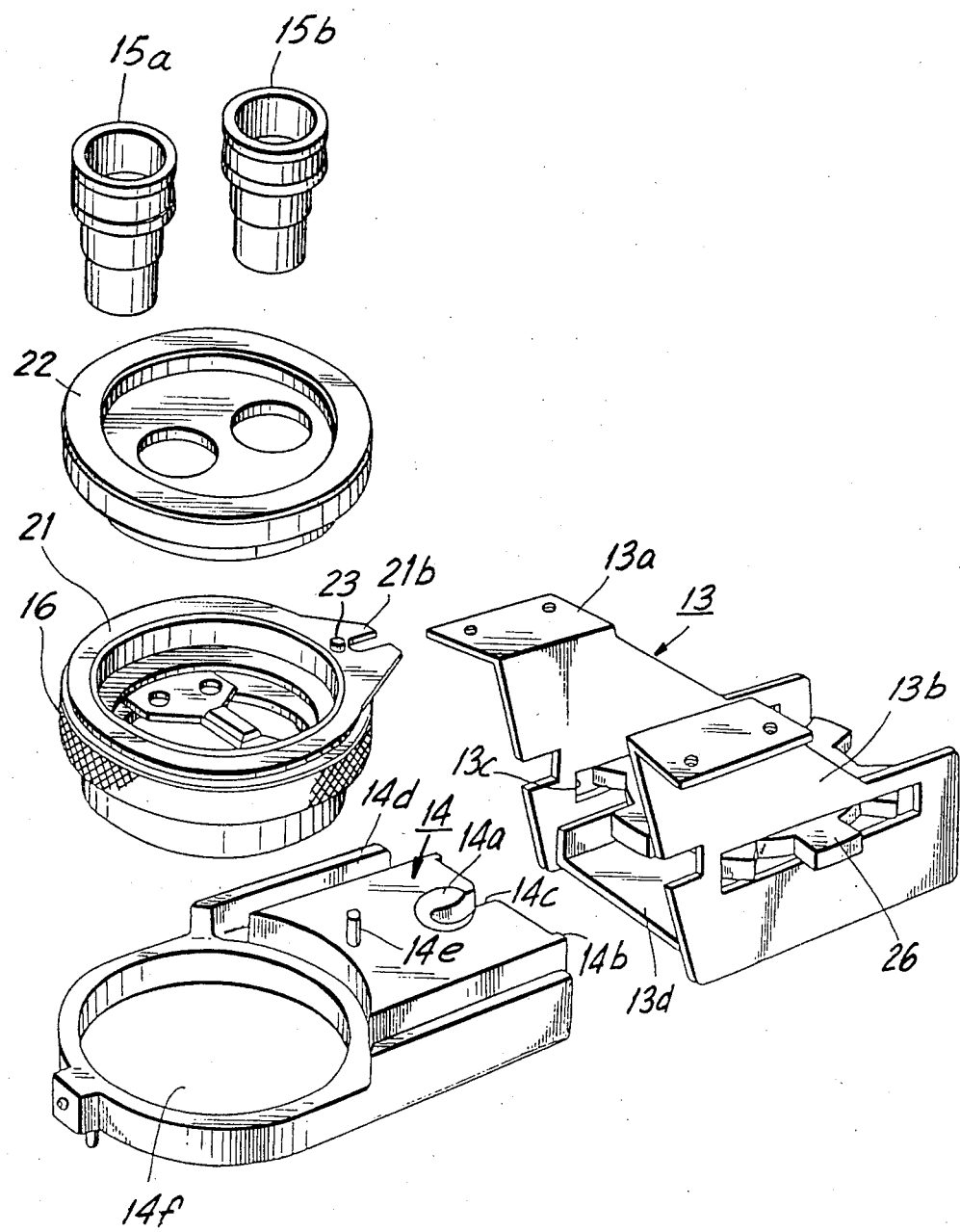
FIG. 2 is an exploded perspective view to show essential parts of an embodiment of the present invention.
Figure 3:
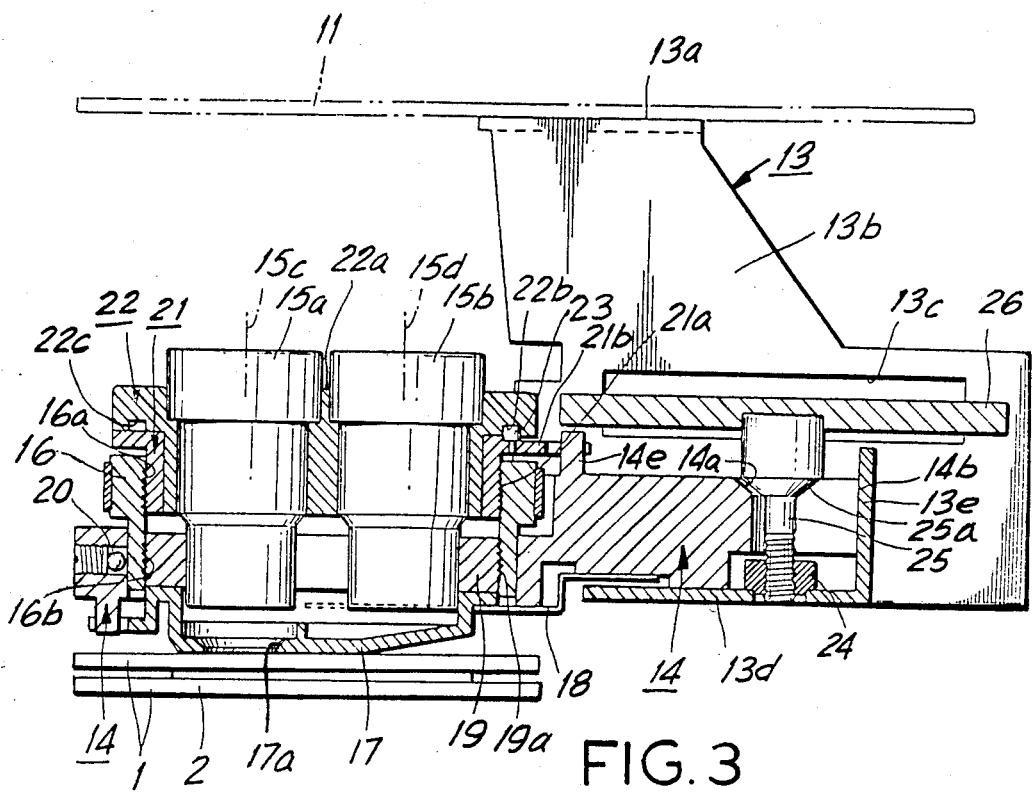
FIG. 3 is a cross sectional view of the embodiment of this invention when viewed from the right side.
Figure 4:
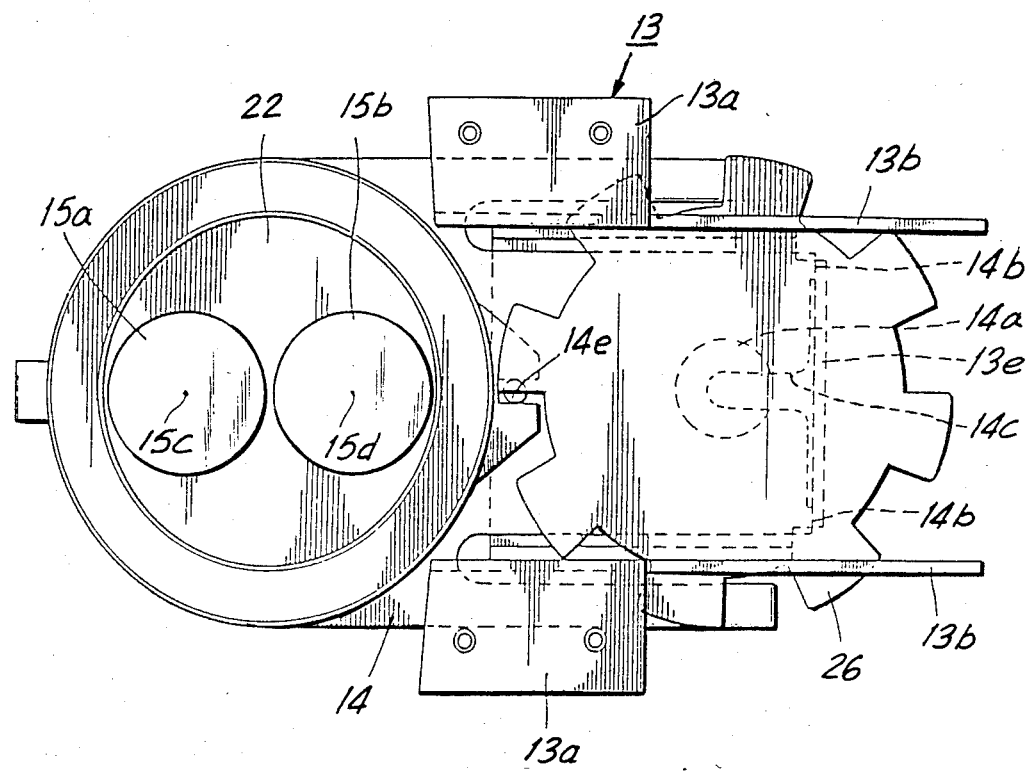
FIG. 4 is a plan view of the present embodiment.
Figure 5:
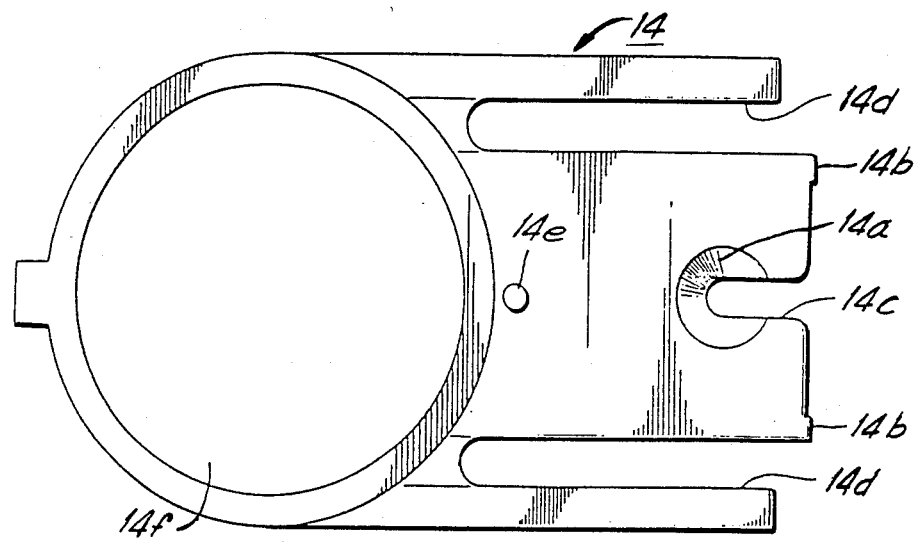
FIG. 5 is a plan view to show an inserting member of the present embodiment.
Figure 6:
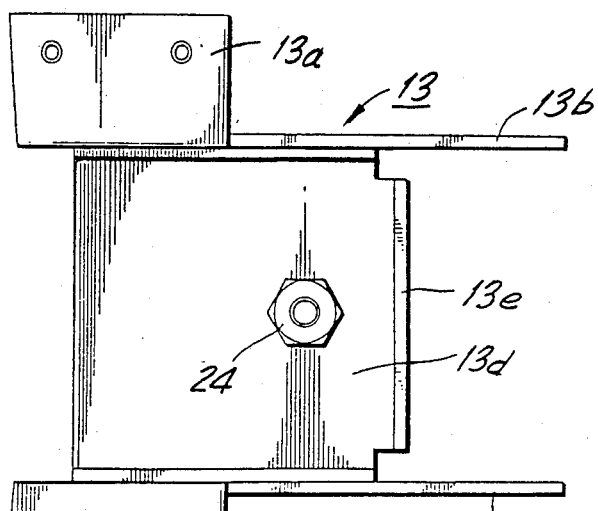
FIG. 6 is a plan view to show a guide member of the present embodiment.
Figure 7:
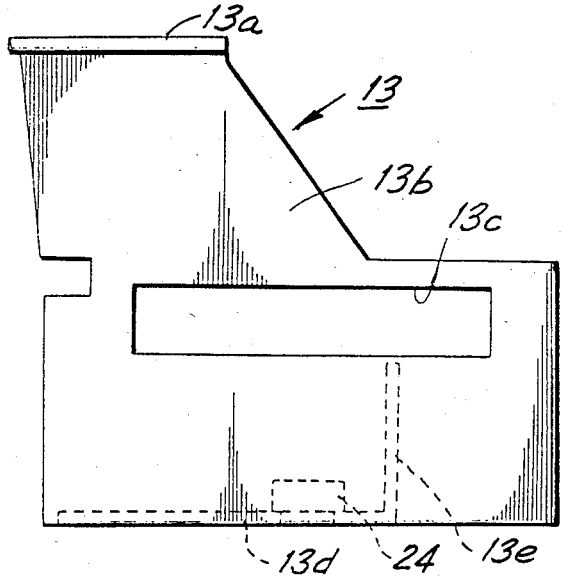
FIG. 7 is a right side view of the guide member.

This invention will now be described referring to a first embodiment which is applied to a microfilm reader-printer, shown in FIGS. 2 to 7. A guide member 13 is contoured as a frame, and the upper surface thereof 13a is secured on a cage 11 of the main body. Windows 13c are provided on the sides 13b thereof. The bottom thereof forms a sliding member 13d. A stopper 13e is provided on the end of the sliding member 13d. The inserting member in the form of a plate 14 is disposed to slide along the sliding member 13d to be inserted into said guide member 13. The inserting member 14 is formed with an inclined surface, such as a cone-shaped hole 14a, and with two guiding grooves 14d. Two lenses 15a, 15b are to be mounted on the inserting member 14.

The mounting mechanism for lenses is described in more detail hereinbelow. A focus ring 16 in ring form is rotatably inserted into the inserting member 14. Female threads 16a, 16b are provided on the inner circumference of the focus ring 16. A floating mask 17 having an aperture 17a is secured to a ring member 19 having male threads 19a which mate with said female threads 16b and contacts the upper surface of a film carrier 1. The focus ring 16 rotates within an annular hole 14f of the inserting member 14. Steel balls 20 are adapted to rollingly contact the outer circumference of the focus ring 16 so as to smoothen the revolution of the ring 16. A lower member 21 of ring form has a male thread 21a formed on the outer periphery thereof and a swivel stop 21b which is forked at the tip end thereof. Male thread 21a is mated with the female thread 16a of the focus ring 16. The swivel stop 21b holds a projection 14e of the inserting member 14 so as to obstruct the revolution of the lower member 21. Accordingly, when the focus ring 16 is rotated, the lower member 21 is axially moved without rotating. In other words, the focus ring 16 moves up and down while rotating in respect of the floating mask 17. By the vertical movement of the focus ring 16, the lower member 21 is moved also up and down. The upper member 22 is mounted rotatably on the lower member 21 and holds the two lenses 15a, 15b as well. As the focus ring 16 rotates, the lenses 15a, 15b move vertically so that their focal points are aligned. The optic axis 15c of the lens 15a and the optic axis 15d of the lens 15b are positioned at locations equally distanced from the center of rotation 22a of the upper member 22. Both lenses 15a, 15b are held in a manner to direct the optic axes 15c, 15d thereof vertically. Positioning holes 22b, 22c are formed on the lower surface of the upper member 22 at an interval of 180°. When a positioning pin 23 on the swivel stop 21b is inserted into the positioning hole 22b, the lens 15a comes to lie above the aperture 17a. When the upper member 22 is lifted from this position and turned by 180° to insert the positioning pin 23 into the hole 22c, the lens 15b comes to lie above the aperture 17a. The aperture 17a of the floating mask 17 serves to direct only the light necessary for a predetermined image to either the lens 15a or the lens 15b. A supporting plate 18 restricts the floating mask 17 from moving downward excessively.

A receptacle member in the form of a nut 24 is secured on the sliding member 13d of said guide member 13. The nut 24 is positioned to come to lie over the aperture of the cone-shaped hole 14a on the side of the smaller diameter when the member 14 is inserted into the guide member 13 to abut on the stopper 13e. A groove 14c is bored to extend from the tapered hole 14a to the surface 14b of the member 14. An engaging member in the form of a bolt 25 is adapted to be snugly fitted in the smaller diameter portion of the cone-shaped hole 14a, the contacting seat surface 25a thereof is tapered to correspond to said cone-shaped hole 14a, and a knob 26 of disk form is secured on the top thereof. The knob 26 projects through a window 13c to outside of the side face 13b. Instead of the nut 24, a female thread may be formed directly on the sliding member 13d to mate with the bolt 25.

The operation of an embodiment of this invention constructed as above will now be explained below.

In order to mount the device, the inserting member 14 is first taken out of the guide member 13 and desired lenses 15a, 15b are mounted on the upper member 22. The operation is extremely simple as the inserting member 14 has been taken out of the guide member 13 to offer a wider space for the mounting operation of the lenses. Then, the guide groove 14d is fit in the side face 13b and the inserting member 14 is slid along the sliding member 13d to be inserted into the guide member 13. This makes the bolt 25 to be inserted through the groove 14c and to within the cone-shaped hole 14a. Simultaneously, the surface 14b comes to abut on the stopper 13e. As the knob 26 is turned to engage the bolt 25 with the nut 24, the tapered seat 25a comes to slidingly contact the cone-shaped hole 14a. A component of the thus generated force pushes the member 14 to the side of the stopper 13e. As a result, the face 14b comes to closely contact the stopper 13e to precisely determine the position of the member 14 in the advancing direction and the position thereof in the lateral direction which crosses perpendicularly the advancing direction. As the lenses 15a, 15b are positioned at desired locations above the lamp chamber 3 (FIG. 1), the optic axes of the lenses 15 can be aligned at a higher precision. If the focus ring 16 is turned, the lower member 21 and the upper member 22 of the lens holder are moved vertically to align the focal points of the lenses 15a, 15b. If the upper member 22 is turned to insert the positioning pin 23 into either holes 22b or 22c, either lens 15a or lens 15b is selected for use.

Lenses may be replaced in the following manner. When the lenses are positioned by the operation mentioned above, if the knob 26 is turned in counterclockwise direction, the bolt 25 is loosened from the nut 24. When the bolt 25 is loosened to move upward, member 14 is taken out of the guide member 13. The member 14 is thus drawn out of the narrow space 12 of the optical apparatus and then a lens is exchanged for another lens. After a new lens is mounted, the device is attached following the procedure mentioned above so that the new lens in precisely positioned.

Although the upper member 22 of the device is mounted with only two lenses in the above-mentioned embodiment, the device may easily be modified to accommodate a different number of lenses, e.g. three lenses or four lenses by separately preparing such holders.

Figure 8:
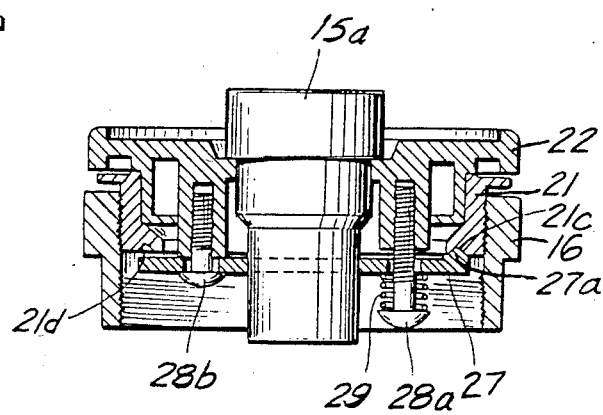
FIG. 8 is a cross sectional view of essential parts viewed from the front of another embodiment of this invention.

FIG. 8 is a cross section of another embodiment having a different positioning mechanism of the upper member 22 as viewed from front. As shown in the figure, a positioning member 27 having a click 27a protruding upward is secured on the lower surface of the upper member 22 with bolts 28a, 28b. A spring 29 is interposed within the space between the bolt 28a and the positioning member 27. The positioning member 27 is therefore adapted to be forced down against the force of the spring 29 supported by the bolt 28b. Recessed portions 21c, 21d are formed at two positions 180° apart from each other on the lower surface of the lower member 21 to receive said click 27a. Therefore, when the upper member 22 is turned, the engagement between the click 27a and the recessed portion 21c is released and when the member is turned by 180°, the click 27a is inserted into the recessed portion 21d, thereby positioning the upper member 22, or in other words, the lenses 15a, 15b at predetermined positions.

As described in detail in the foregoing statement, this invention can position lenses at a higher precision because the inserting member on which lenses are mounted is disposed to be inserted into a guide member, the tip end face of the inserting member is made to closely contact the stopper of the guide member, and a tapered bolt is inserted into a tapered hole on the inserting member. According to this invention, the mounting-/demounting operation of the lenses on the inserting member becomes extremely simple as the inserting member is taken out of the guide member in advance and lenses are exchanged in a larger open space outside. The device may be adapted to mount an arbitrary number of lenses simply by separately preparing other inserting members for different numbers of lenses.

What is claimed as the invention is:

1. An optical lens holder comprising: a guide member to be secured on a main body of an optical apparatus, said guide member having a sliding member and also having a stopper at an end thereof, an inserting member slidable along said sliding member into said guide member and having a tip end for abutment against said stopper and also having an inclined surface, a receptacle member on said guide member, an engaging member engageable in said receptacle member and having a contacting surface corresponding to said inclined surface, said engaging member pushing said tip end of said inserting member onto said stopper with a component of the force generated by sliding contact of said contact surface on said inclined surface when said enagaging member is engaged by said receptacle member, a focus ring having an inner circumference with a threaded portion, and mounted into said inserting member in a freely rotatable manner, a lower member in the form of a ring having an outer circumference with a threaded portion mated with the threaded portion of said focus ring but being non-rotatable, and an upper member mounted on the lower member in a rotatable manner and holding at least one lens in a mountable/demountable manner.

2. An optical lens holder as claimed in claim 1, wherein the inclined surface on the inserting member is a tapered surface of a cone-shaped hole on the inserting member.

3. An optical lens holder as claimed in claim 1, wherein the receptacle member is a nut on the guide member with a thread engaging the engaging member.

4. An optical lens holder as claimed in claim 1, wherein the engaging member is a bolt having a seat which is tapered to correspond to the inclined surface of the inserting member.

5. An optical lens holder as claimed in claim 1, wherein the rotatable upper member has means for detachably holding plural lenses located at a predetermined distance from the center of revolution of the upper member.

* * * * *